Nov. 4, 1969   B. WARD   3,475,984
STEERING COLUMN ASSEMBLY
Filed April 10, 1968
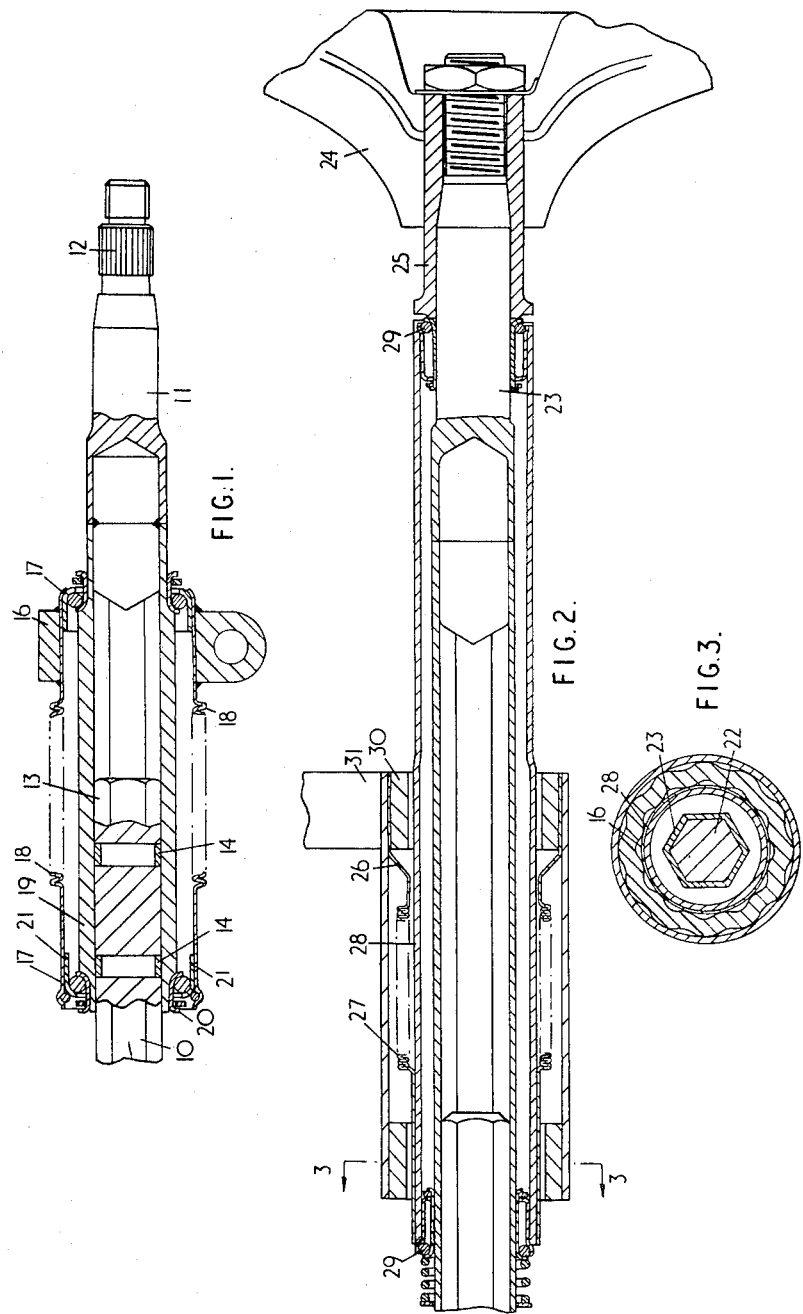
INVENTOR
BENJAMIN WARD
ATTORNEYS

United States Patent Office 3,475,984
Patented Nov. 4, 1969

3,475,984
STEERING COLUMN ASSEMBLY
Benjamin Ward, Rubery Rednal, near Birmingham, England, assignor to Burman & Sons Limited, Kings Norton, Birmingham, England
Filed Apr. 10, 1968, Ser. No. 720,180
Claims priority, application Great Britain, Apr. 11, 1967, 16,541/67
Int. Cl. B62d 1/18
U.S. Cl. 74—492         3 Claims

ABSTRACT OF THE DISCLOSURE

A vehicle steering column assembly comprising an inner column and an outer column telescopable relative to each other and adapted at opposite ends of the assembly to be connected to a steering wheel and a vehicle steering mechanism, the outer column being disposed along at least part of the its length within a sleeve having a series of circumferentially extending corrugations, one end of the sleeve being fixed in use whereas the other end of the sleeve is interconnected with the outer column so that downward axial movement of said outer column will result in expansion of the sleeve and opening out of said corrugations thereof.

---

The object of this invention is to provide, for use in a road vehicle, an improved steering column assembly which can collapse if in use the vehicle in which the assembly is mounted is involved in a crash, so as thereby to minimise the risk of injury to the driver of the vehicle.

A steering column assembly in accordance with the invention comprises a pair of columns, namely an inner column and an outer column which are arranged so as to be capable of telescoping relative to each other, said columns being adapted at opposite ends of the assembly to be connected to a steering wheel and a vehicle steering mechanism, the outer column being disposed, along at least part of its length, within a sleeve having a series of circumferentially extending corrugations or convolutions arranged so that one end of said sleeve is adapted to be secured to a part of the vehicle in which in use the assembly will be mounted whilst the other end of the sleeve is so interconnected with the outer column that if the latter is displaced by means of an impact relative to the vehicle in a direction towards the inner column then said corrugations or convolutions will be opened out to absorb at least part of the energy of the impact.

Conveniently, the outer column is arranged (at its upper end) to be connected to the steering wheel whilst the inner column is adapted (at its lower end) to be connected to the steering mechanism of the vehicle.

The invention will now be more particularly described with reference to the accompanying drawings wherein:

FIGURE 1 is a longitudinal sectional view of part of one example of a steering column assembly constructed in accordance with the invention, FIGURE 2 is a longitudinal sectional view showing part of an alternative construction, and FIGURE 3 is a section taken on the line 3—3 of FIGURE 2.

In the example shown in FIGURE 1, there is provided a pair of columns namely an inner column 10 and an outer column 11. The outer column is adapted at its upper end 12 to be connected to a steering wheel (not shown) whilst the other end of the outer column is formed with an axially extending bore of non-circular (for example, hexagonal) configuration in section.

The inner column 10 is adapted at its lower end to be connected to the vehicle steering mechanism (not shown) which may be of any conventional form whilst the upper end 13 of said inner column is formed to a non-circular cross-sectional configuration corresponding to the configuration of the aforementioned bore provided in the other column, said upper end of the inner column extending into the lower end of the outer column.

If desired, the inner column may be formed in its periphery with one or more circumferentially extending grooves in which are mounted resilient collars 14 which bear against the surface of the bore formed in the outer column so as to prevent or reduce rattle between the two columns. In addition the two columns are interconnected by means of a peg (not shown) which extends through a hole formed in the outer column and into a recess or hole formed in the inner column so as thereby to locate the two columns longitudinally. Said peg is, however, adapted to shear to allow the two columns to telescope relative to each other should an impact be applied to the lower end of the inner column.

There is also provided a sleeve 15 which extends around the outer column along at least part of its length, the upper end of said sleeve being secured as by means of welding to brackets 16 to any convenient part of the vehicle such as the dashboard. At both the upper and lower ends of said sleeve there is provided a bearing 17 which enables the outer column to rotate relative to the sleeve on rotation of the steering wheel. Said sleeve 15 is formed of resilient material such as steel and is provided along at least part of its length with a series of corrugations or convolutions 18 which may be formed for example by compressing axially a length of steel tubing in a specially prepared die. The lower end of said outer column is formed with an abutment in the form of a shoulder 19 on which is mounted a flanged ring 20, said ring or the shoulder (where no such ring is provided) engaging one side of the bearing provided at said lower end of the sleeve 15 whilst a reinforcing ring 21 secured to the interior of the sleeve has an abutment in the form of an inturned flange which engages the opposite side of said bearing. Alternatively, the last mentioned abutment may be provided by an inwardly directed rib formed on the sleeve itself.

When the above-described steering column assembly is mounted in a vehicle the aforementioned corrugations or convolutions 18 will normally be arranged so that they are relatively close together. In the event of the vehicle being involved in a crash, however, an impact may be applied to the lower end of the inner column 10 in which case the two columns can telescope as above-described. If, however, an impact is also applied to the upper end of the outer column 11 as may be caused for example by the driver of the vehicle being propelled forwardly onto the steering wheel, the outer column can move axially downwardly relative to the vehicle but in so doing the lower end of said sleeve will move axially downwardly as well so as to expand the sleeve. Such expansion will have the effect of opening out said corrugations or convolutions 18 and will absorb at least part of the energy applied to the upper end of the outer column by the impact referred to. This absorption of impact energy will tend to minimise injury which might otherwise be caused to the driver of the vehicle. Furthermore, with the construction above described, the upper end of the sleeve 15 (which is secured by brackets 16 as above described) is intended to remain fixed so that the brackets need not be of the so-called "tear-away" kind.

As above-described the inner column is adapted to be connected to the vehicle steering mechanism whilst the outer column is connected to the steering wheel but alternatively the inner column can be connected to the steering wheel and the outer column to the steering mechanism.

In the alternative embodiment illustrated in FIGURES 2 and 3, there is provided an inner column 22 and an outer column 23 as before, the lower end of the outer column having a hexagonal bore into which the hexagonal upper end of the inner column enters so that the inner and outer columns are capable of telescoping relative to each other. The lower end of the inner column is connected in use to the vehicle steering mechanism (not shown) whilst the upper end of the outer column is connected to a steering wheel 24 mounted on a bush 25.

There is also provided as before a sleeve 26 having corrugations or convolutions 27 but in this case there is interposed between the sleeve 26 and the outer column 23 a tube 28, bearings 29 being provided whereby the outer column can rotate relative to the tube. The upper end of the sleeve 26 is secured between a ring 30 and a further tube 31 which is itself connected to a fixed bracket 32 so that said upper end of the sleeve is fixed, the lower end of the sleeve being secured to the exterior of the lower end of the tube 28.

If an impact is applied to the steering wheel 24 so as to cause the outer column 23 to move downwardly, the lower end of the bush 25 will engage the upper end of the tube 28 and thereby move said tube downwardly as well, thus expanding the sleeve 26 and opening out the corrugations thereof to absorb the energy of the impact as before.

Having thus described my invention what I claim as new and desire to secure by Letters Patent is:

1. A vehicle column assembly comprising a pair of columns, namely an inner column and an outer column which are arranged so as to be telescopable relative to each other and which are adapted at opposite ends of the assembly to be connected to a steering wheel and a vehicle steering mechanism, and a sleeve through which the outer column extends, said sleeve having a series of circumferentially extending corrugations, one end of the sleeve being adapted in use to be fixed to a part of a vehicle in which the assembly is mounted whilst the other end of the sleeve is operatively interconnected with the outer column that downward axial movement of the latter will be accomplished by expansion of said sleeve and opening out of the corrugations thereof.

2. A vehicle steering column assembly as claimed in claim 1 wherein a bearing is provided between the outer column and each end of said sleeve whereby said outer column is rotatable relative to the sleeve, the in situ upper end of the sleeve being fixed and the outer column having an outwardly extending abutment whereas the lower end of the sleeve is provided with an inwardly extending abutment, the lower of said two bearings being disposed between said abutments.

3. A vehicle steering column assembly as claimed in claim 1 wherein the outer column extends through a tube which itself extends through said sleeve, the in situ upper end of the sleeve being fixed whilst the lower end of the sleeve is connected to the exterior of said tube so as to be axially movable therewith, the outer column being rotatable relative to the tube and having means adapted to engage the upper end of said tube so that downward axial movement of the outer column will be accompanied by downward axial movement of the tube together with extension of said sleeve.

References Cited

UNITED STATES PATENTS 3,198,288   8/1965   Presunka _____ 188—1
3,401,576   9/1968   Eckels _____ 74—493

MILTON KAUFMAN, Primary Examiner

U.S. Cl. X.R.

188—1